Nov. 1, 1938.  R. D. FISHER  2,135,070
SPIDER
Filed May 22, 1936  2 Sheets-Sheet 1
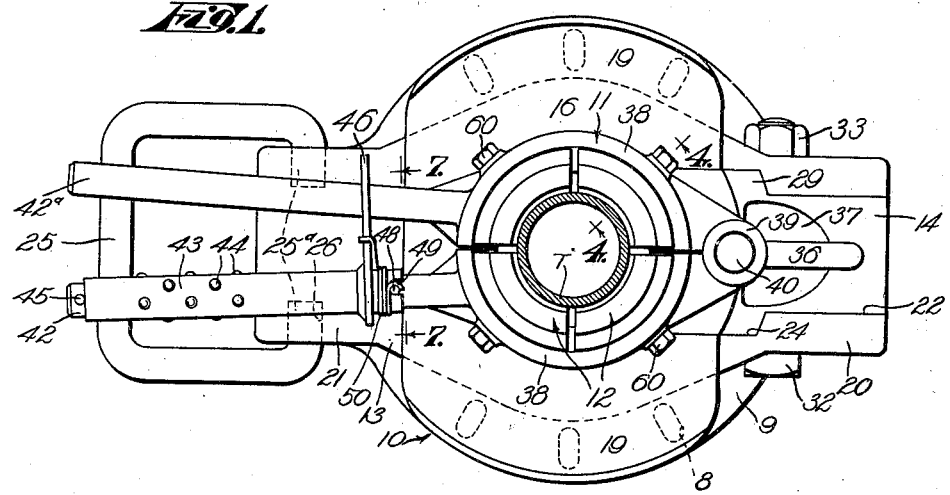
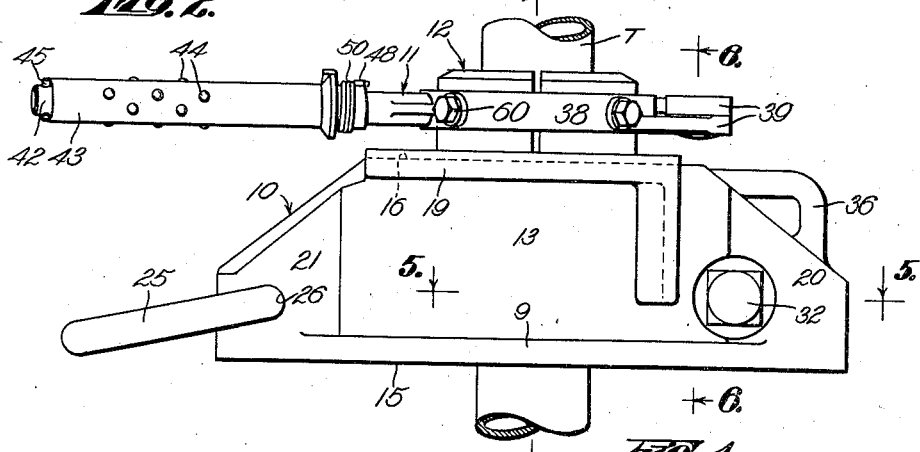
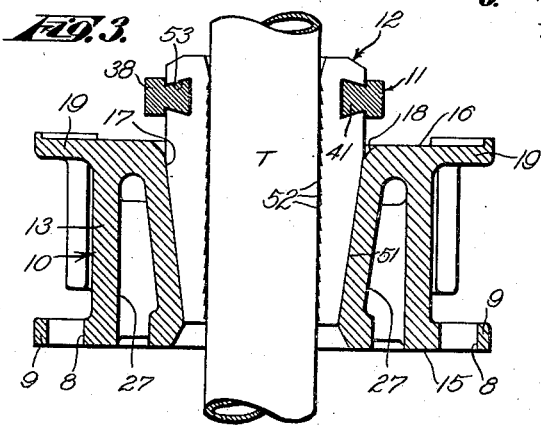
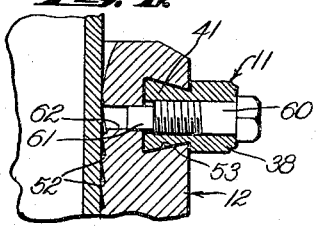
Inventor
RALPH D. FISHER
By
His Attorney

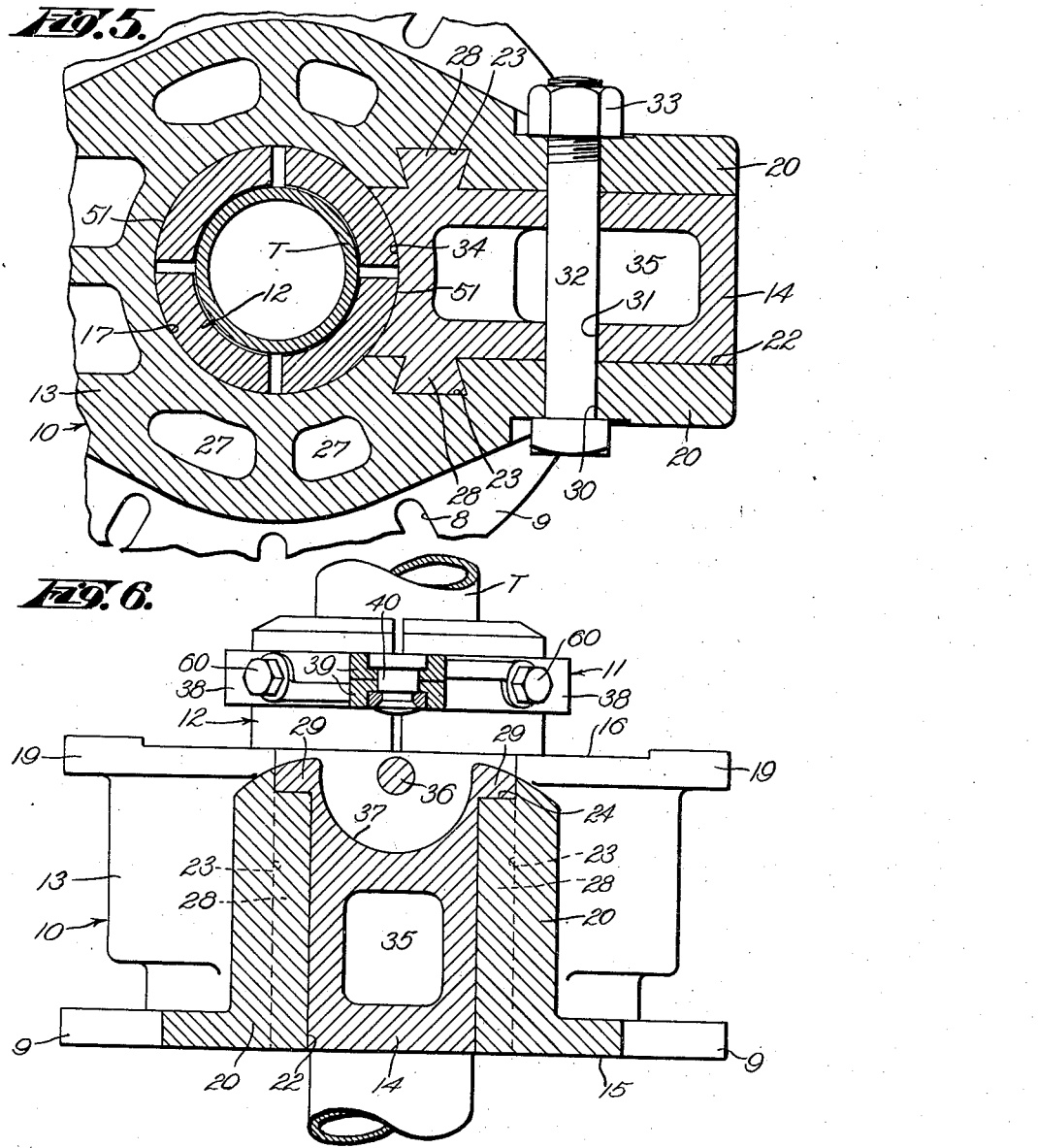

Patented Nov. 1, 1938

2,135,070

UNITED STATES PATENT OFFICE 2,135,070

SPIDER

Ralph D. Fisher, Long Beach, Calif., assignor to Baash-Ross Tool Company, Los Angeles, Calif., a corporation of California Application May 22, 1936, Serial No. 81,211

5 Claims. (Cl. 24—263)

This invention relates to well drilling equipment and relates more particularly to a tubing spider. A general object of this invention is to provide a practical, convenient and effective tubing spider for handling tubing, pipe, sucker rods, and the like.

Another object of this invention is to provide a tubing spider embodying a body that may be easily and quickly arranged in the operative position about the tubing or object to be handled.

Another object of this invention is to provide a tubing spider having a set of slips that may be quickly and readily assembled about a tubing or the like and arranged in the spider body to grip and suspend the tubing.

Another object of this invention is to provide a tubing spider having tongs supporting the slips in a manner to facilitate their assembly about the tubing and their insertion in the spider body.

Another object of this invention is to provide a tubing spider of the character mentioned in which the slips cannot fall or become displaced from the tongs and yet may work or shift with respect to the tongs to properly conform to the tapered seat of the body and to properly grip the tubing.

Another object of this invention is to provide a tubing spider of the character mentioned in which slips for handling tubing and other objects of various diameters may be quickly secured in the tongs for use in the spider body.

Another object of this invention is to provide a tubing spider of the character mentioned that is easy to use and manipulate, that is light in weight, compact, and that is inexpensive.

The various objects and features of my invention will be fully understood from the following detailed description of a typical preferred form and application of the invention, throughout which description reference is made to the accompanying drawings, in which:

Fig. 1 is a top or plan view of the spider assembly provided by the present invention, showing the slips in operative engagement with a tubing. Fig. 2 is a side elevation of the assembly. Fig. 3 is a vertical detailed sectional view taken as indicated by line 3—3 on Fig. 2. Fig. 4 is an enlarged fragmentary vertical detailed sectional view taken substantially as indicated by line 4—4 on Fig. 1. Fig. 5 is an enlarged fragmentary horizontal detailed sectional view taken as indicated by line 5—5 on Fig. 2. Fig. 6 is an enlarged vertical detailed sectional view taken as indicated by line 6—6 on Fig. 2 and Fig. 7 is an enlarged vertical detailed sectional view taken as indicated by line 7—7 on Fig. 1.

The improved spider of the present invention includes, generally, a body 10 adapted to be arranged about a tubing T, tongs 11, and slips 12 carried by the tongs 11 and adapted to seat in the body 10 to grip the tubing T.

The body 10 is provided to receive and support the slips 12 for gripping the tubing T. In accordance with the invention the body 10 is such that it may be easily and quickly arranged in the operative position around the tubing T. The body 10 comprises a main section 13 and a key section or gate 14. The main body section 13 has a flat lower surface 15 and may have a flat upper surface 16. Flanges 9 may be provided on the section 13 to increase the size of the surface 15, and elongate bolt holes 8 may be provided in the flanges 9 to adapt the device for arrangement on tubing heads of various sizes and shapes. A central vertical opening 17 is provided in the body section 13 to pass the tubing T and to receive the slips 12. The wall of the opening 17 is tapered downwardly and inwardly to form an effective seat for the wedge-like slips 12. An annular sharply pitched face 18 may be provided at the upper end of the opening 17 to facilitate the introduction of the slips 12 at the opening. Laterally projecting horizontal flanges 19 may project from the main section 13 adjacent its upper end. The flanges 19 are diametrically opposite one another and ears 20 and 21 project laterally from the section 13 at points between the flanges 19. The upper outer corners of the ears 20 and 21 may be bevelled as illustrated. The ears 20 and 21 are preferably integral with the main section 13.

A lateral or radial opening or channel 22 extends outwardly through the ear 20 from the opening 17. The channel 22 is provided to receive and pass the tubing T when the section 13 is shifted laterally relative to the tubing to bring the body 10 in operative relation to the tubing. The width of the channel 22 is preferably somewhat greater than the diameter of the largest tubing T for which the device is intended. The side walls of the channel 22 may be flat and parallel. Vertical dove-tailed grooves 23 are provided in the walls of the channel 22 adjacent to and spaced from the opening 17. Recesses 24 are provided in the upper side of the section 13 at the upper ends of the grooves 23. The channel 22 is provided to receive the gate 14 as will be hereinafter described. A bail or handle 25 is provided on the ear 21. The handle 25 may be substantially square and has its opposite end portions 25ᵃ pivotally received in sockets 26 in the opposite sides of the ear 21 whereby the handle may be swung between an up position and the down or inoperative position illustrated in Fig. 2. The main body section 13 is preferably provided with a multiplicity of openings or chambers 27 to be light in weight.

The gate 14 of the body 10 is adapted to occupy the channel 22 to provide a continuous body assembly around the tubing T. The gate 14 is shaped to be readily passed or entered downwardly into the channel 22. Dove-tailed tongues 28 project from the opposite sides of the gate 14 and are adapted to cooperate with the grooves 23 to hold the gate 14 against outward displacement. Flanges 29 project from the gate 14 at its upper end and are adapted to seat in the recesses 24 to limit the downward movement of the gate in the channel 22. A transverse opening 30 is provided in the ear 20 and intersects the channel 22. A transverse opening 31 is provided in the gate 22 and registers with the opening 30 when the gate is in the proper position in the channel. A bolt 32 is passed through the openings 30 and 31 to positively lock the gate 14 in the channel 22. A nut 33 may be threaded on the bolt 32. The inner surface or side 34 of the gate 14 is concave and is adapted to form a continuation of the wall of the opening 17 whereby the assembly of the section 13 and the gate 14 presents a continuous central opening or seat for receiving the slips 12. The gate 14 may be provided with an opening or chamber 35 to lessen its weight. A bail or handle 36 is provided on the upper side of the gate 14. The handle 36 is diametrically opposite the center of the handle 25 whereby the spider may be suspended, if desired. A depression or recess 37 is provided in the upper side of the gate 14 below the handle 36 so that the handle may be readily grasped.

The tongs 11 form a convenient means for handling and manipulating the slips 12. The tongs 11 include two jaw members 38 of partially circular or substantially semi-circular plan configuration. Overlapping lugs 39 are provided on the members 38 and a headed and riveted pin 40 extends through openings in the lugs 39 to hingedly connect the jaw members. Dove-tailed tongues 41 extend around the interiors of the semi-circular jaw members 38. The tongues 41 are preferably curved concentrically with the members 38. Suitable handles 42 and 42ᵃ project from the outer or free ends of the jaw members 38. The handles 42 and 42ᵃ are rigid with the jaw members and in practice may be welded to the members.

The invention provides a novel latch means in connection with the handles 42 and 42ᵃ to releasably hold the members and their slips 12 in proper engagement about the tubing T. A sleeve 43 is turnably mounted on the handle 42. The sleeve 43 may be roughened or provided with knobs 44 whereby it may be readily grasped. A pin 45 on the outer part of the handle 42 limits the outward movement of the sleeve. A catch or latch 46 is fixed to the sleeve 43 and projects therefrom for cooperation with the handle 42ᵃ. The nose or active end portion of the latch 46 has a notch 47 in its under side for cooperating with the handle 42ᵃ. A pin 48 projects from the handle 42 and cooperates with a circumferential notch 49 in the inner end of the sleeve 43. A torsional spring 50 is wrapped about the sleeve 43 and has one end part cooperating with the pin 48 and one end part bearing on the latch 46. The spring 50 urges the latch downwardly into cooperation with the handle 42ᵃ. The sleeve 43 may be grasped and turned to free the latch 45 from the handle 42ᵃ whereby the handles may be spread to free the slips 12 from the tubing T when the slips are free of the opening 17.

The slips 12 are provided to grasp and hold the tubing T. The slips 12 are carried by the tong members 38. The slips 12 are wedge-like parts having tapered external surfaces 51 shaped to fit or conform to the opening 17 in the body 10. The inner sides of the slips 12 are concaved to conform to the tubing T and are provided with teeth 52 for gripping the tubing. The slips 12 are sufficiently long to have extensive cooperation with the opening 17 and to project from the upper side of the body 10 when seated in the opening. It is preferred to provide two slips 12 on each tong member 38. The several slips 12 may be identical.

Novel means is provided by the invention for securing the slips 12 to the tong members 38. The projecting upper portions of the slips 12 are provided with circumferentially extending dove-tailed grooves 53. The dove-tailed grooves 53 are provided in the exteriors of the slips 12 and are proportioned to rather freely or loosely receive the tongues 41 of the members 38. The grooves 53 receive the tongues 41 with sufficient clearance to allow the slips 12 to work or play and thus conform to the tapered opening 17 and properly engage about the tubing T. Screws 60 are threaded in openings in the tong members 38 and have reduced inner end parts 61 extending into openings 62 in the slips 12. The cooperation of the pin parts 61 with the openings 62 prevents circumferential shifting of the slips 12. In practice a single screw 60 may be provided for cooperating with each slip 12. The openings 62 are spaced substantially midway between the vertical ends of the slips. The slips 12 are related so that their vertical ends are spaced apart as best illustrated in Figs. 1 and 5 of the drawings. The slips 12 are proportioned to properly engage about and grip a tubing T of specified diameter. The slips 12 secured to the tong members 38 as just described are readily removable whereby slips suitable for handling tubing of various diameters may be readily provided in the tongs 11.

In arranging the slips 12 in the tongs 11 a slip 12 is brought to the position where its groove 53 receives the outer end of a tongue 41. The slip 12 is then shifted so that its groove 53 receives the tongue 41 and is further moved to a position where its opening 62 is aligned with the innermost screw 60. A second slip 12 is then arranged on the tong member 38 in a similar manner and the slips are secured in place by means of the screws 60. It will be observed that the slips 12 are dependably held against loss or displacement from the tongs 11 and yet may have sufficient play or movement to properly seat in the opening 17 and conform to the tubing T.

It is believed that the operation of the spider provided by this invention will be readily apparent from the foregoing detailed description. When it is desired to employ the spider the gate 14 is removed from the section 13 and the section is shifted laterally toward the tubing T so that its channel 22 receives the tubing. The section 13 is moved in this manner until it is substantially central with respect to the tubing T. The gate 14 is then passed downwardly into the channel 22. The flanges 29 cooperate with the recesses 24 to limit the downward movement of the gate. The tongues 38 cooperate with the grooves 23 to definitely and properly position the gate 14 where its inner surface 34 forms a continuation of the wall of the opening 17. If desired or believed necessary the bolt 32 may then be arranged through the openings 30 and 31 and provided with the nut 33 whereby the gate 14 is securely held against displacement from the section 13.

The tongs 11 carrying the proper slips 12 are then arranged about the tubing T and manipulated to enter the slips 12 in the opening 17. It will be noted that the tongs 11 may be easily carried and shifted about to manipulate the slips 12 as desired. When the slips 12 are in proper position about the tubing T the handles 42 and 42ª may be shifted toward one another so that the latch 46 snaps into cooperation with the handle 42ª. Thereafter the latch 46 holds the tongs in proper assembled relation about the tubing T. The slips 12 seated in the tapered opening 17 tightly wedge against the tubing T and are operable to dependably support or suspend the tubing. The slips 12 may be easily freed from the tubing T by merely turning the sleeve 43 to release the latch 46 whereupon tongs 11 may be moved to free the slips 12 from the opening 17 and the handles 42 and 42ª moved apart to release the slips from the tubing T. The spider provided by the present invention is inexpensive and is particularly convenient to use.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. In combination, a tubing spider body having an opening for receiving a tubing and a channel communicating with the opening whereby the body may be moved laterally relative to the tubing to have the opening receive the tubing, a gate insertable downwardably in the channel to occupy the same, tongue and groove connections between the body and gate preventing outward movement of the gate, the body having recesses in its upper side at the channel flanges on the gate adapted to seat in said recesses to have their upper sides substantially flush with the upper side of the body and to limit the downward movement of the gate in the channel, and slips adapted to seat in the opening to grip the tubing.

2. In a tubing spider having a body for extending around a tubing, the combination of, two hingedly connected members having curved inner sides, dove-tailed tongues extending along said inner sides, a plurality of slips carried by each member and insertable in the body opening, the slips having dove-tailed grooves removably and loosely receiving the tongues whereby the slips may tilt about substantially horizontal axes relative to the members; and each slip having an opening, and screws on the members cooperating with the openings to prevent circumferential displacement of the slips.

3. In a tubing spider having a body for extending around a tubing, the combination of, two hingedly connected members, slips carried by the members to have play with respect thereto and insertable in the body opening to grip the tubing, handles on the members to facilitate manipulation of the slips, and means for releasably holding the members in operative position, said means comprising a latch pivoted on one handle and adapted to hook over the other handle.

4. In a tubing spider having a body for extending around a tubing, the combination of, two hingedly connected members, slips carried by the members to have play with respect thereto and insertable in the body opening to grip the tubing, handles on the members to facilitate manipulation of the slips, and means for releasably holding the members in operative position, said means including a turnable sleeve on one handle, and a latch on the sleeve for cooperating with the other handle.

5. In a tubing spider having a body for extending around a tubing, the combination of, two hingedly connected members, slips carried by the members to have play with respect thereto and insertable in the body opening to grip the tubing, handles on the members to facilitate manipulation of the slips, and means for releasably holding the members in operative position, said means including a turnable sleeve on one handle, a latch on the sleeve for cooperating with the other handle, and a spring acting on the sleeve to hold the latch in cooperation with said other handle.

RALPH D. FISHER.